United States Patent [19]

Nakayama et al.

[11] Patent Number: 5,635,296
[45] Date of Patent: Jun. 3, 1997

[54] MAGNETO-OPTICAL RECORDING MEDIUM WHEREON OVERWRITING IS PERMITTED BY LIGHT INTENSITY MODULATION

[75] Inventors: Junichiro Nakayama; Michinobu Mieda, both of Shiki-gun; Hiroyuki Katayama; Akira Takahashi, both of Nara; Kenji Ohta, Kitakatsuragi-gun, all of Japan

[73] Assignee: Sharp Kabushiki Kaisha, Osaka, Japan

[21] Appl. No.: 260,095

[22] Filed: Jun. 15, 1994

[30] Foreign Application Priority Data

Jun. 21, 1993 [JP] Japan ................................. 5-149463

[51] Int. Cl.$^6$ ........................................................ G11B 5/66
[52] U.S. Cl. ............... 428/332; 428/336; 428/694 MM; 428/694 MT; 428/694 EC; 428/694 RE; 428/694 ML; 428/694 SC; 369/13
[58] Field of Search ...................... 428/694 MM, 428/694 MT, 694 EC, 694 RE, 694 ML, 694 SC, 332, 336, 900; 369/13

[56] References Cited

U.S. PATENT DOCUMENTS 5,278,810  1/1994  Takahashi et al. ........................ 369/13

FOREIGN PATENT DOCUMENTS

| 258978 | 3/1988 | European Pat. Off. . |
|---|---|---|
| 509836 | 10/1992 | European Pat. Off. . |
| 9855 | 1/1985 | Japan . |
| 107751 | 6/1985 | Japan . |
| 173746 | 9/1985 | Japan . |
| 171652 | 9/1985 | Japan . |
| 63-239 637 | 10/1988 | Japan . |
| 63-316 343 | 12/1988 | Japan . |
| 2-024 801 | 1/1990 | Japan . |

OTHER PUBLICATIONS

Engl.abstract of Osato/Canon App.No. 63–239637–A, pub. Oct.'88.
Engl.abstract of Osato/Canon App.No. 63–316343–A, pub. Dec.'88.
Engl.abstract of Kaneko/Sony App.No. 2–24801–A, pub Jan.'90.
H. Iida, et al., "Recording Power Characteristics of 130 mm Overwritable MO Disk by Laser Power Modulation Method," in Int. Symp. on Optical Memory, Jap.Journal of Applied Physics, vol. 28, (1989), Supplement 28-3, pp. 367–370.

*Primary Examiner*—Leszek Kiliman
*Attorney, Agent, or Firm*—David G. Conlin; Milton Oliver

[57] ABSTRACT

A magneto-optical recording medium includes a first magnetic layer, a second magnetic layer and a third magnetic layer respectively made of rare earth-transition metal alloys. The first magnetic layer has a perpendicular magnetization in a temperature range between room temperature and its Curie temperature. The second magnetic layer has its Curie temperature higher than that of the first magnetic layer, and coercive force thereof at room temperature is nearly zero. The third magnetic layer has a perpendicular magnetization in a temperature range between room temperature and its Curie temperature. The Curie temperature of the third magnetic layer is higher than the Curie temperature of the first magnetic layer. The coercive force of the third magnetic layer at room temperature is lower than that of the first magnetic layer. The compensation temperature of the third magnetic layer is higher than that of the second magnetic layer. Having the above arrangement, an overwriting is permitted on the magneto-optical recording medium, and an initializing magnetic field and a recording magnetic field in a magneto-optical recording and reproducing device are set in the same direction.

7 Claims, 4 Drawing Sheets

MAGNETO-OPTICAL RECORDING MEDIUM WHEREON OVERWRITING IS PERMITTED BY LIGHT INTENSITY MODULATION

BACKGROUND OF THE INVENTION

1. Field of the Invention

The present invention relates to a magneto-optical recording medium such as an optical disk, an optical card, etc., for use in carrying out at least recording, reproducing or erasing information optically.

2. Description of the Prior Art

When a magneto-optical recording method is adopted, a recording medium which includes a substrate having formed thereon a magnetic thin film with perpendicular magnetization made of a magnetic substance is used, and recording and reproducing operations on and from the recording medium are performed in the manner presented below.

When a recording operation is to be carried out, first, the direction of the magnetization in the recording medium is arranged in one direction (upward or downward) by applying thereto a strong external magnetic field, in order to initialize the recording medium. Next, a laser beam is projected onto a recording area of the recording medium so as to raise temperature thereof above the vicinity of its Curie temperature or above the vicinity of its compensation temperature. As a result, coercive force Hc at the portion becomes zero or nearly zero. In this state, an external magnetic field (bias magnetic field) having an opposite direction to an initializing magnetic field is applied, thereby reversing the magnetization direction. After the projection of the laser beam is stopped, the temperature of the recording medium drops to room temperature, and the reversed magnetization direction is fixed, thereby recording information thermomagnetically.

When a reproducing operation is to be carried out, a linearly polarized laser beam is projected onto the recording medium, and the recorded information is optically read out utilizing an effect that the polarization plane of reflected or transmitted light rotates differently according to the magnetization direction (magnetic Kerr effect or magnetic Faraday effect).

The magneto-optical recording medium designed for the above magneto-optical recording method has been viewed with interest as a rewritable high density and large capacity memory device. In order to rewrite information on the magneto-optical recording medium, one of the following methods is required:

(a) initializing through any method;

(b) devising an external magnetic field (bias magnetic field) generation device so as to enable an overwriting operation (rewriting without requiring an erasing operation); and (c) devising the recording medium so as to enable the overwriting operation.

However, when the method (a) is adopted, an initialization device or two magnetic heads are required, thereby presenting the problem of high cost. If a rewriting operation is carried out using only one magnetic head, the problem is presented in that a long time is required because a recording operation can be carried out only after carrying out the erasing operation. On the other hand, when the method (b) is adopted, the magnetic head may crash as in the case of the magnetic recording.

Thus, the method (c) of devising the recording medium is the most effective method. According to this method, by employing a double-layered exchange coupled film for a recording layer, an overwriting operation is enabled, for example, as disclosed in Jap. Jour. Appl. Phys., Vol. 28(1989) Suppl. 28-3, pp. 367-370.

The processes for the overwriting operation will be briefly described below. As shown in FIG. 6, in the magneto-optical recording medium composed of a first magnetic layer 9 and a second magnetic layer 10, an initializing magnetic field $H_{init}$ is applied thereto so as to arrange the magnetization in the second magnetic layer 10 in one direction (downward in the figure) in order to initialize the recording medium. Here, an initialization may be carried out whenever an operation is to be carried out or only when a recording operation is to be carried out. In this state, since a coercive force Hi of the first magnetic layer 9 is larger than the initializing magnetic field $H_{init}$, the direction of the magnetization in the first magnetic layer 9 is not reversed as shown in FIG. 7.

Then, a recording operation is performed by projecting a laser beam which is to be switched between a High level I and a Low level II, while applying a recording magnetic field $H_w$.

Here, the High level I is defined such that when a laser beam of the High level I is projected, both the temperatures of the first magnetic layer 9 and the second magnetic layer 10 are raised to the temperature $T_H$ which is in the vicinity of or above the Curie temperatures $T_1$ and $T_2$.

As shown in FIG. 6, when a laser beam of the High level I is projected, the direction of the magnetization in the second magnetic layer 10 is reversed upward by applying thereto the recording magnetic field $H_w$. Then, in the process of cooling off, the direction of the magnetization in the first magnetic layer 9 is arranged in the direction of the magnetization in the second magnetic layer 10 by the exchange force exerted on an interface. As a result, the direction of the magnetization in the first magnetic layer 9 is arranged upward.

The Low level II is defined such that when a laser beam of the Low level II is projected, only the temperature of the first magnetic layer 9 is raised to the temperature $T_L$ which is in the vicinity of or above its Curie temperature $T_1$.

Thus, when a laser beam of the Low level II is projected, the direction of the magnetization in the second magnetic layer 10 is not reversed by applying thereto the recording magnetic field $H_w$. As in the case of projecting the laser beam of the High level I, the direction of the magnetization in the first magnetic layer 9 is arranged in the direction of the magnetization in the second magnetic layer 10 in the process of cooling off by an exchange force exerted onto an interface. As a result, the direction of the magnetization in the first magnetic layer 9 is arranged downward as shown in FIG. 6.

Additionally, the recording magnetic field $H_w$ is set significantly smaller than the initializing magnetic field $H_{init}$, and the intensity of the laser beam used in reproducing is set significantly lower than the lower level II used in recording.

However, when the above method is adopted, an extremely large initializing magnetic field $H_{init}$ is required because interfacial coupling force exerted between the first magnetic layer and the second magnetic layer 10 is large. This is because if a combination of the first magnetic layer 9 and the second magnetic layer 10 which can make the required initializing magnetic field $H_{init}$ smaller is employed, an overwriting cannot be performed.

In order to counteract the above problems, a recording medium having a triple-layer structure wherein an intermediate layer is formed between the first magnetic layer 9 and the second magnetic layer 10 has been proposed in order to make the required initializing magnetic field $H_{init}$ smaller.

For example, the Japanese Laid Open Patent Publication No. 239637/1988 (Tokukaishou 63-239637) discloses an intermediate layer made of a material which has an in-plane magnetization at room temperature. However, when adopting the above intermediate layer, the problem is presented in that the magnetization may not be copied from the second magnetic layer 10 to the first magnetic layer 9 desirably especially at high temperature.

The Japanese Laid Open Patent Publication No. 24801/1990 (Tokukaihei 2-24801) discloses another intermediate layer made of a material which has an in-plane magnetic magnetization at room temperature. Since the first magnetic layer 9 is rare-earth metal rich at room temperature, the following problems are presented: the direction of $H_{init}$ is different from the direction of the recording magnetic field $H_w$, and initialization may not be carried out desirably.

SUMMARY OF THE INVENTION

An object of the present invention is to provide a magneto-optical recording medium whereon an overwriting operation by the light intensity modulation is permitted.

Another object of the present invention is to provide a magneto-optical recording medium which enables an initializing magnetic field in a recording and reproducing device to have the same direction as a recording magnetic field.

A still another object of the present invention is to provide a magneto-optical recording medium which enables a reproduction of a smaller recording bit and a higher recording density compared with the conventional magneto-optical recording medium.

In order to solve the above problem, the magneto-optical recording medium of the present invention is arranged so as to include the first magnetic layer made of rare earth-transition metal alloys, the second magnetic layer made of rare earth-transition metal alloys formed on the first magnetic layer and the third magnetic layer made of rare earth-transition metal alloys, formed on the second magnetic layer. The magneto-optical recording medium having the above arrangement is characterized in that:

the first magnetic layer has a perpendicular magnetization in a temperature range between room temperature and its Curie temperature;

the second magnetic layer has properties that its Curie temperature is higher than the Curie temperature of the first magnetic layer, a coercive force thereof at room temperature is virtually zero and that it has an in-plane magnetization at room temperature and a transition occurs therein from the in-plane magnetization to the perpendicular magnetization at above a predetermined temperature; and the third magnetic layer has properties that it has a perpendicular magnetization in a temperature range between room temperature and its Curie temperature, the Curie temperature is higher than the Curie temperature of the first magnetic layer, a coercive force thereof at room temperature is smaller than that of the first magnetic layer and that its compensation temperature is higher than the compensation temperature of the second magnetic layer.

According to the above arrangement, a magnetic coupling between the first magnetic layer and the third magnetic layer will not occur at room temperature, while at high temperature at which a recording operation is permitted, the magnetic coupling between the first magnetic layer and the third magnetic layer occurs. Thus, an overwriting by the light intensity modulation is permitted. Moreover, since the compensation temperature of the second magnetic layer is set lower than the compensation temperature of the third magnetic layer, a recording operation on the first magnetic layer can be smoothly performed.

Additionally, by arranging the third magnetic layer such that its Curie temperature falls within a range of 150°–400° C. and that a coercive force thereof at room temperature is below 3k Oe, the initializing magnetic field can be set below 3k Oe.

In order to solve the above problem, the magneto-optical recording medium having the above arrangement is characterized in that:

a composition of the first magnetic layer is set to be transition-metal rich or a compensation composition at room temperature;

a composition of the second magnetic layer is set to be rare-earth metal rich at room temperature and to have its compensation temperature in a range between 100° C. and 250° C.; and a composition of the third magnetic layer is set to be rare-earth metal rich at room temperature and to have its compensation temperature in a range between 100° C. and 300° C.

In the above arrangement, since the third magnetic layer has its compensation temperature, the direction of the magnetization in the third magnetic layer is dominated by a rare earth metal in a range between room temperature and compensation temperature, while it is dominated by a transition metal in a range between compensation temperature and Curie temperature. Namely, the direction of the magnetization recorded at high temperature at which a recording operation is permitted is reversed, and thus the direction of the initializing magnetic field in the recording and reproducing device can be set in the same direction as the recording magnetic field. Thus, the above arrangement enables the size of the recording and reproducing device to be reduced.

The magneto-optical recording medium of the present invention having the above arrangement may be further arranged such that a zeroth magnetic layer is formed on a surface of the first magnetic layer on an opposite side where the second magnetic layer is formed. The zeroth magnetic layer has its Curie temperature higher than that of the first magnetic layer, and a coercive force thereof at room temperature is nearly zero. The zeroth magnetic layer has an in-plane magnetization at room temperature, and a transition occurs therein from the in-plane magnetization to a perpendicular magnetization at above a predetermined temperature.

In the above arrangement, an overwriting operation by the light intensity modulation is permitted. Moreover, in reproducing, when a light beam is projected onto the zeroth magnetic layer, a temperature distribution of the irradiated portion becomes like a Gaussian distribution. Therefore, only the temperature of the area having a diameter smaller than the light spot diameter can be raised.

As temperature rises, a transition occurs from the in-plane magnetization to the perpendicular magnetization. Then, by the exchange coupling force exerted between the zeroth magnetic layer and the first magnetic layer, the direction of the magnetization in the zeroth magnetic layer is arranged in the direction of the magnetization in the first magnetic layer. As the transition occurs from the in-plane magnetization to the perpendicular magnetization in the portion having a temperature rise, only the portion subject to the temperature rise shows polar Kerr effect, thereby reproducing information based on a light reflected from the portion.

When a spot of the light beam is shifted so as to reproduce the next recording bit, the temperature of the previously reproduced portion drops, and thus a transition occurs from the perpendicular magnetization to the in-plane magnetization. Accordingly, in the portion having a temperature drop, the polar Kerr effect is no longer exerted. This indicates that the information in the form of a magnetization direction recorded on the first magnetic layer is masked by the in-plane magnetization in the zeroth magnetic layer. As a result, interferences by signals from the adjoining bits, which cause a noise and a reduction in the resolution of the reproducing signal, hardly occur, thereby achieving an improvement in the signal quality. As described, only the area having a temperature rise above a predetermined temperature is subject to reproduction, a significant improvement in the recording density can be achieved.

For a fuller understanding of the nature and advantages of the invention, reference should be made to the ensuing detailed description taken in conjunction with the accompanying drawings.

DESCRIPTION OF THE EMBODIMENTS

The following description will discuss an embodiment of the present invention with reference to FIG. 1 through FIG. 4.

Figure 1:
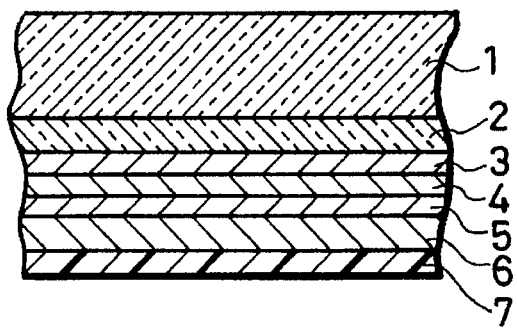
FIG. 1 is a cross-sectional view which shows a schematic configuration of a magneto-optical disk in accordance with the first embodiment of the present invention.

As shown in FIG. 1, a magneto-optical recording medium is composed of a light transmitting substrate 1 having formed thereon a light transmitting dielectric film 2, a magnetic layer 3 (first magnetic layer), a magnetic layer 4 (second magnetic layer), a magnetic layer 5 (third magnetic layer), a protective layer 6 and an overcoat film 7 which are laminated in this order.

Figure 2:
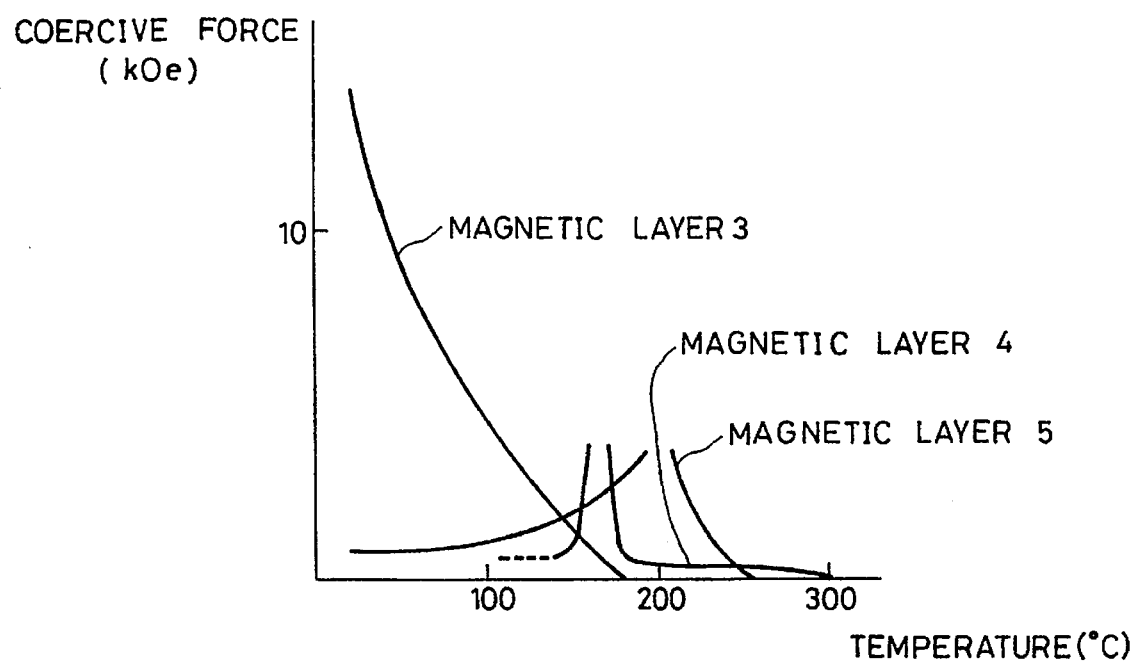
FIG. 2 is an explanatory view showing temperature dependencies of coercive force of each magnetic layer in the magneto-optical disk of FIG. 1.

The magnetic layers 3, 4 and 5 are respectively made of rare earth-transition metal alloys. As shown in FIG. 2, the composition of magnetic layer 3 is selected such that its Curie temperature $Tc_1$ is lower than those of the magnetic layers 4 and 5 and that a coercive force $Hc_1$ thereof at room temperature is larger than those of the magnetic layers 4 and 5. The magnetic layer 3 has a perpendicular magnetization in a temperature range between room temperature and the Curie temperature $Tc_1$.

The magnetic layer 4 is selected such that its Curie temperature $Tc_2$ is higher than the Curie temperature $Tc_1$ of the magnetic layer 3, its coercive force $Hc_2$ at room temperature is nearly zero, and that a transition occurs therein from the in-plane magnetization to the perpendicular magnetization at above a predetermined temperature.

The magnetic layer 5 is selected such that its Curie temperature $Tc_3$ is higher than the Curie temperature $Tc_1$ of the magnetic layer 3, a coercive force $Hc_3$ at room temperature is smaller than the coercive force $Hc_1$ of the magnetic layer 3, and that it has the perpendicular magnetization in a temperature range between room temperature and the Curie temperature $Tc_3$.

Additionally, the compensation temperature $T_{comp2}$ of the magnetic layer 4 is set lower than the compensation temperature $T_{comp3}$ of the magnetic layer 5.

Figure 3A:
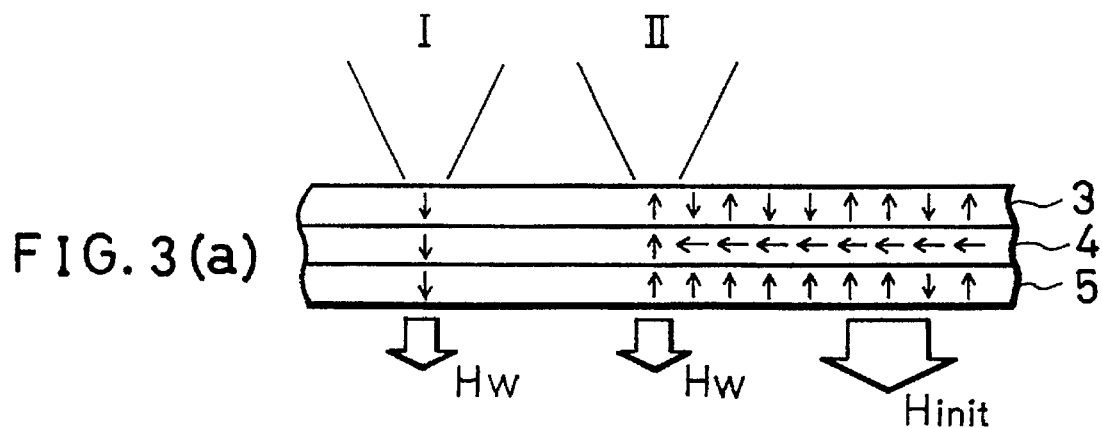
FIG. 3(a) and FIG. 3(b) are explanatory views respectively showing processes for recording on the magneto-optical disk of FIG. 1.

When a recording operation is to be carried out on the magneto-optical recording medium having the above arrangement, first, an initialization is carried out. Namely, as shown in FIG. 3(a), by applying a downward initializing magnetic field ($H_{init}$), only the magnetization in the magnetic layer 5 is arranged in one direction. FIG. 3(a) shows a sub-lattice magnetization in the transition metal in the magnetic layer 5 by an arrow, which is so-called rare-earth metal rich where the sub-lattice magnetization in the rare-earth metal is larger than the sub-lattice magnetization in the transition metal.

An initialization may be carried out whenever an operation is to be carried out or only when a recording operation is to be carried out. The coercive force $Hc_1$ of the magnetic layer 3 is set larger than the initializing magnetic field $H_{init}$, and the magnetic layer 4 has the in-plane magnetization. Therefore, the direction of the magnetization in the magnetic layer 5 is not copied to the magnetic layer 3 through the magnetic layer 4, and thus the magnetization in the magnetic layer 3 is not reversed when initializing.

Figure 4:
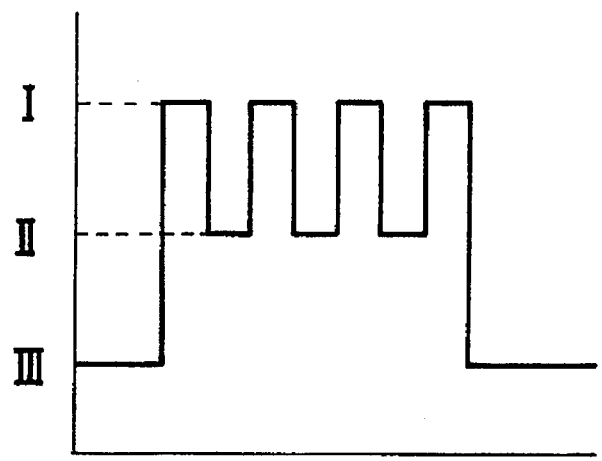
FIG. 4 is an explanatory view showing intensities of a laser beam to be projected on the magneto-optical disk of FIG. 1.

In recording, while a recording magnetic field $H_w$ which has the same direction as the initializing magnetic field $H_{init}$ and is significantly smaller than the initializing magnetic field $H_{init}$ is being applied, a laser beam which is to be switched between a High level I and a Low level II is projected as shown in FIG. 4.

The High level I and the Low level II are respectively defined as follows: when a laser beam of the High level I is projected, the temperatures of the magnetic layers 3 and 5 are raised to temperature $T_H$ which is in the vicinity of or above the Curie temperatures $Tc_3$; and when a laser beam of the Low level II is projected, only the temperature of the magnetic layer 3 is raised to the temperature $T_L$ which is in the vicinity of or above Curie temperature $Tc_1$.

Therefore, when the laser beam of the High level I is projected, the magnetization in the magnetic layer 5 is reversed to an upward direction by the recording magnetic field $H_w$. In the process of cooling off, since the magnetic layer 4 also shows the perpendicular magnetization, the direction of the magnetization in the magnetic layer 5 is copied to the magnetic layer 4 by an exchange coupling force exerted on an interface. Furthermore, the direction of the magnetization in the magnetic layer 4 is copied to the magnetic layer 3. As a result, the direction of the magnetization in the magnetic layer 3 is arranged in the same direction as the direction of the magnetization in the magnetic layer 5 (upward direction).

On the other hand, when the laser beam of the Low level II is projected, the magnetization in the magnetic layer 4 is not reversed by the recording magnetic field $H_w$. In the process of cooling off, since the magnetic layer 4 has a perpendicular magnetization, the magnetization in the magnetic layer 5 is copied to the magnetic layer 4 by an exchange coupling force exerted on the interface as in the case of projecting the laser beam of the High level I. Furthermore, the magnetization direction in the magnetic layer 4 is copied to the magnetic layer 3. As a result, the direction of the magnetization in the magnetic layer 3 is arranged in the direction of the magnetization in the magnetic layer 5 (downward direction).

An overwriting process by the light intensity modulation on the magneto-optical medium having a triplilayer structure of the present embodiment will be explained below in more detail in reference to FIG. 3(b).

The magnetic layer 3 is made of rare earth-transition metal alloy having a perpendicular magnetization in a temperature range of room temperature—Curie temperature $T_{c1}$. The composition thereof is set such that it is transition metal rich and has a large coercive force at room temperature.

The magnetic layer 4 is made of rare earth-transition metal alloy. The magnetic layer 4 has an in-plane magnetization at room temperature, and a composition thereof is set such that a transition occurs therein from the in-plane magnetization to a perpendicular magnetization at above room temperature.

Figure 3B:
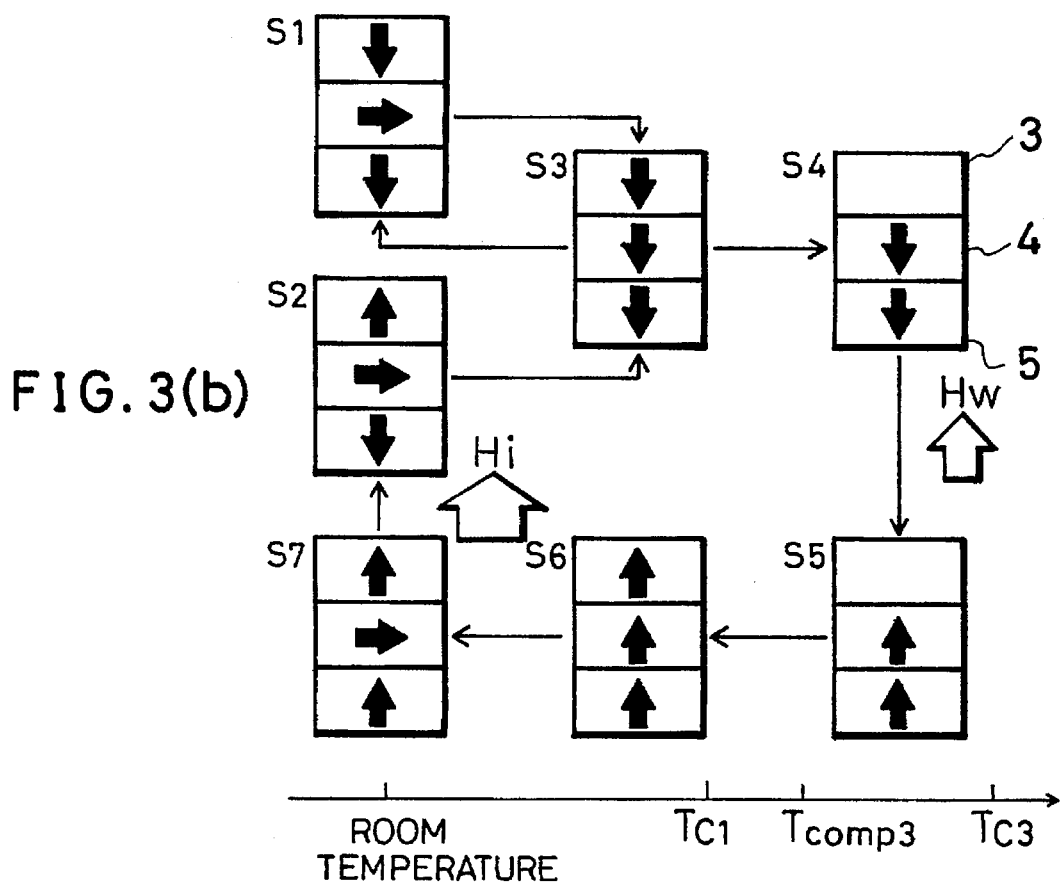

FIG. 3(b) shows respective magnetization states of the magnetic layers 3, 4 and 5, in which x-axis indicates temperature. As being made of rare earth-transition metal alloys, each layer has a total magnetization and respective sub-lattice magnetizations in a rare-earth metal and a transition metal. In the figure, an arrow shows a sub-lattice magnetization in the transition metal in each layer.

When an overwriting operation is to be carried out on the medium having the above-mentioned arrangement, first, the magnetic layer 5 is initialized. Namely, with the application of the initializing magnetic field $H_{init}$, the direction of the magnetization in the magnetic layer 5 is arranged in one direction (upward in the figure). Then, while the recording magnetic field $H_w$ having the same direction as the initializing magnetic filed $H_{init}$ is being applied, the intensity of the light beam is changed according to information to be recorded. Then, by repeating the first process 1 for raising the temperature of the portion irradiated with the light beam to the vicinity of Curie temperature $T_{c3}$ of the magnetic layer 5 and the second process for raising the temperature of the portion irradiated with the light beam to the vicinity of Curie temperature $T_{c1}$ of the magnetic layer 3, information is rewritten by way of overwriting.

At room temperature, two stable conditions S1 and S2 exist depending on the sub-lattice magnetization in the magnetic layer 3. Since the coercive force of the magnetic layer 5 is small, the magnetization is set parallel to the initializing magnetic filed $H_{init}$. Since the composition of the material used in the magnetic layer 5 is rare earth metal rich, the magnetization in the magnetic layer 5 is antiparallel to the sub-lattice magnetization. Therefore, the sub-lattice magnetization becomes antiparallel to the initializing magnetic field $H_{init}$.

In the first process, as the temperature of the portion irradiated with the light beam is raised to the vicinity of Curie temperature $T_{c3}$ of the magnetic layer 5, the magnetization no longer exists in the magnetic layer 3, and the magnetization in the magnetic layer 5 is set parallel to the sub-lattice magnetization. As a result, the sub-lattice magnetization in the magnetic layer 5 is inverted to be parallel to the recording magnetic field Hw. Namely, the above states S1 and S2 change to the states S3, S4 and finally to the state S5.

With the rotations of the magneto-optical disk, a portion irradiated with the light beam is shifted, and the previously irradiated portion is cooled off. Then, the sub-lattice magnetization in the magnetic layer 4 is arranged in the sub-lattice magnetization in the magnetic layer 5 by an exchange force exerted on an interface between the magnetic layer 4 and the magnetic layer 5. As a result, the sub-lattice magnetization in the magnetic layer 3 is set parallel to the sub-lattice magnetization in the magnetic layer 4 by an exchange force exerted on the interface between the magnetic layer 3 and the magnetic layer 4. Namely, the state S5 changes to the state S6.

When the temperature is further dropped to room temperature, a transition occurs again in the magnetic layer 4 from the perpendicular magnetization to the in-plane magnetization, and an exchange coupling force is no longer exerted between the magnetic layer 3 and the magnetic layer 5. Namely, the state S6 changes to the state S7.

By applying an initializing magnetic filed $H_{init}$ at room temperature on the magneto-optical disk being rotated, the direction of the magnetization in the magnetic layer 3 remains unchanged, and the magnetization direction in the magnetic layer 5 having a small coercive force is reversed. Namely, the state S7 changes to the state S2.

In the second process, even when the portion irradiated with the light beam is raised to the vicinity of $T_{c1}$, the composition of the magnetic layer 5 remains rare earth metal rich and the coercive force of the magnetic layer 5 is larger than the recording magnetic field $H_w$. Thus, the magnetization in the magnetic layer 5 is not reversed by applying thereto the recording magnetic filed $H_w$. As a result, the sub-lattice magnetization in the magnetic layer 3 is set parallel to the sub-lattice magnetization in the magnetic layer 5. Namely, the states S1 and S2 change to the state S3.

With the rotations of the magneto-optical disk rotates, when a spot of the light beam is shifted so as to reproduce the next recording bit, temperature of the previously reproduced portion drops to room temperature. With a temperature drop, a transition occurs in the portion of the magnetic layer 4 from the perpendicular magnetization to the in-plane magnetization, and thus an exchange coupling force is no longer exerted between the magnetic layer 3 and the magnetic layer 5. Namely, the state S3 changes to the state S1.

As described, in the first process, the magnetic layer 3 is changed to the state S2 where the magnetization (sub-lattice magnetization) shows upward. On the other hand, in the second process, the magnetic layer 3 is changed to the state S1 where the magnetization (sub-lattice magnetization) shows downward. Namely, an overwriting by the light intensity modulation is permitted.

Moreover, because the compensation temperature $T_{comp3}$ of the magnetic layer 5 is set between room temperature and Curie temperature $T_{c3}$, the initializing magnetic field is arranged in the direction of the magnetization in the recording magnetic layer $H_w$. Therefore, by providing the magnetic layer 4 having the in-plane magnetization at room temperature between the magnetic layer 3 and the magnetic layer 5, the required initializing magnetic field $H_{init}$ can be made smaller.

In the described manner, an overwriting operation can be carried out by projecting the laser beam which is to be switched between the High level I and the Low level II.

In reproducing, a laser beam of the level III which has a significantly lower intensity than the laser beam used in recording is projected, and the rotation of the polarization plane of a reflected light is detected.

As an example of the magneto-optical recording medium, a magneto-optical disk of sample #1 is shown below.

In the magneto-optical disk of sample #1, a light transmitting substrate 1 is made of a disk-shaped glass with a diameter of 86 mm, a center hole of 15 mm and a thickness of 1.2 mm. A guide track for guiding a light beam is formed in a concave-convex shape with a pitch of 1.6 μm, a groove width of 0.8 μm and a land width of 0.8 μm. The track is formed directly on the glass by a reactive ion etching method.

On the surface of the substrate 1 whereon the guide track is formed, AlN with a thickness of 80 nm is formed as a dielectric film 2 by a reactive sputtering method. On the dielectric film 2, a magnetic layer 3 made of DyFeCo with a thickness of 50 nm, a magnetic layer 4 made of GdFeCo with a thickness of 50 nm, a magnetic layer 5 made of GdDyFeCo with a thickness of 50 nm and a protective film 6 made of AlN with a thickness of 80 nm are laminated. Here, the magnetic layer 3 is formed by a simultaneous sputtering using Dy, Fe and Co targets. The magnetic layer 4 is formed by a simultaneous sputtering using Gd, Fe and Co targets. The magnetic layer 5 is formed by a simultaneous sputtering using Gd, Dy, Fe and Co targets.

The sputtering conditions in forming the magnetic layers 3, 4 and 5 are as follows:

ultimate vacuum: $2.0 \times 10^{-4}$ Pa or below

Ar gas pressure: $6.5 \times 10^{-1}$ Pa discharge power: 300 W

The sputtering conditions in forming the dielectric film 2 and the protective film 6 are as follows:

ultimate vacuum: $2.0 \times 10^{-4}$ Pa or below $N_2$ gas pressure: $3.0 \times 10^{-1}$ Pa discharge power: 800 W The protective film 6 is coated with an ultraviolet hardening resin layer from acrylate series, and an ultraviolet ray is projected thereon so as to harden it, thereby forming the overcoat film 7.

The magnetic layer 3 which is made of $Dy_{0.19}(Fe_{0.86}Co_{0.14})_{0.81}$ and is transition metal rich is set so as to have the following properties:

Curie temperature $Tc_1=170°$ C.; and coercive force $Hc_1$ at room temperature=12k Oe.

The magnetic layer 4 which is made of $Gd_{0.27}(Fe_{0.60}Co_{0.40})_{0.73}$ and is rare-earth metal rich is set so as to have the following properties:

Curie temperature $Tc_2=300°$ C.; and coercive force $Hc_2$ at room temperature≅0 Oe;

Additionally, a transition occurs in the magnetic layer 4 from the in-plane magnetization to the perpendicular magnetization at around 80° C.

The magnetic layer 5 which is made of $(Gd_{0.50}Dy_{0.50})_{0.30}(Fe_{0.72}Co_{0.28})_{0.70}$ and is rare-earth metal rich is set so as to have the following properties:

Curie temperature $Tc_3=250°$ C.;

compensation temperature $T_{comp3}=210°$ C.; and coercive force $Hc_3$ at room temperature=1.5k Oe.

Using the magneto-optical disk of sample #1, recording and reproducing operations were carried out under the following conditions shown in Table 1:

$H_{init}$=2.0k Oe $H_w$=500 Oe laser power of High level I $(P_H)$=10 mW laser power of Low level II $(P_L)$=6 mW reproducing laser power of level III $(P_R)$=1 mW recording bit length=0.78 μm.

As a result, an overwriting operation by the light intensity modulation could be carried out without remaining information.

For comparison, when the conventional magneto-optical disk having a magnetic layer of double layer structure is used, the initializing magnetic filed $H_{init}$ is required to be set to 3.0k Oe.

The following magneto-optical disks of samples #2–#8 have the same configurations as those of the magneto-optical disk of sample #1 except the magnetic layer 4.

A magnetic layer 4 of sample #2 which is made of $Gd_{0.26}(Fe_{0.85}Co_{0.15})_{0.74}$ and is rare-earth metal rich has the following properties:

Curie temperature $Tc_2 \geq 300°$ C.;

compensation temperature $T_{comp2}=140°$ C.; and coercive force $Hc_2$ at room temperature≅0 Oe.

The magnetic layer 4 is arranged such that a transition occurs therein from the in-plane magnetization to the perpendicular magnetization at around 60° C.

A magnetic layer 4 of sample #3 which is made of $Gd_{0.27}(Fe_{0.82}Co_{0.18})_{0.73}$ and is rare-earth metal rich has the following properties:

Curie temperature $Tc_2=290°$ C.;

compensation temperature $T_{comp2}=150°$ C.; and coercive force $Hc_2$ at room temperature≅0 Oe.

The magnetic layer 4 is arranged such that a transition occurs therein from the in-plane magnetization to the perpendicular magnetization at around 75° C.

A magnetic layer 4 of sample #4 which is made of $Gd_{0.27}(Fe_{0.55}Co_{0.45})_{0.73}$ and is rare-earth metal rich has the following properties:

Curie temperature $Tc_2 \geq 300°$ C.;

compensation temperature $T_{comp2}=150°$ C.; and coercive force $Hc_2$ at room temperature≅0 Oe.

The magnetic layer 4 is arranged such that a transition occurs therein form the in-plane magnetization to the perpendicular magnetization at around 80° C.

A magnetic layer 4 of sample #5 which is made of $Gd_{0.28}(Fe_{0.84}Co_{0.16})_{0.72}$ and is rare-earth metal rich has the following properties:

Curie temperature $Tc_2=280°$ C.;

compensation temperature $T_{comp2}=160°$ C.; and coercive force $Hc_2$ at room temperature≅0 Oe.

The magnetic layer 4 is set such that a transition occurs therein from the in-plane magnetization to the perpendicular magnetization at around 80° C.

The magnetic layer 4 of sample #6 which is made of $Gd_{0.28}(Fe_{0.89}Co_{0.11})_{0.72}$ and is rare-earth metal rich has the following properties:

Curie temperature $Tc_2=260°$ C.;

compensation temperature $T_{comp2}=160°$ C.; and coercive force $Hc_2$ at room temperature≅0 Oe.

The magnetic layer 4 is set such that a transition occurs therein from the in-plane magnetization to the perpendicular magnetization at around 80° C.

The magnetic layer 4 of sample #7 which is made of $Gd_{0.28}(Fe_{0.60}Co_{0.40})_{0.72}$ and is rare-earth metal rich has the following properties:

Curie temperature $Tc_2 \geq 300°$ C.;

compensation temperature $T_{comp2}=160°$ C.; and coercive force $Hc_2$ at room temperature≅0 Oe.

The magnetic layer 4 is set such that a transition occurs therein from the in-plane magnetization to the perpendicular magnetization at around 80° C.

The magnetic layer 4 of sample #8 which is made of $Gd_{0.29}(Fe_{0.78}Co_{0.22})_{0.71}$ and is rare-earth metal rich has the following properties:

Curie temperature $Tc_2=280°$ C.;
compensation temperature $T_{comp2}=180°$ C.; and
coercive force $Hc_2$ at room temperature$\cong$0 Oe.

The magnetic layer 4 is set such that a transition occurs therein from the in-plane magnetization to the perpendicular magnetization at around 120° C.

An overwriting operation without remaining information could be carried out on all of the above samples #2–#8 under the recording conditions shown in Table 1.

TABLE 1

| Sample | Hinit (kOe) | Hw (Oe) | $P_H$ (mW) | $P_L$ (mW) | $P_R$ (mW) | recording bit length (μm) |
|---|---|---|---|---|---|---|
| #1 | 2.0 | 500 | 10 | 6 | 1 | 0.78 |
| #2 | 2.0 | 300 | 10 | 6 | 1 | 0.78 |
| #3 | 2.0 | 300 | 10 | 6 | 1 | 0.78 |
| #4 | 2.0 | 400 | 10 | 6 | 1 | 0.78 |
| #5 | 2.0 | 400 | 10 | 6 | 1 | 0.78 |
| #6 | 2.0 | 400 | 10 | 6 | 1 | 0.78 |
| #7 | 2.0 | 500 | 10 | 6 | 1 | 0.78 |
| #8 | 2.0 | 500 | 10 | 6 | 1 | 0.78 |
| #9 | 2.0 | 500 | 10 | 6 | 1 | 0.78 |
| #10 | 2.0 | 500 | 10 | 6 | 1 | 0.78 |
| #11 | 2.0 | 500 | 10 | 6 | 1 | 0.78 |
| #12 | 2.0 | 300 | 10 | 6 | 1 | 0.78 |

The following magneto-optical disks of samples #9–#12 are the same configurations as those of the described sample #1 except the magnetic layer 3.

A magnetic layer 3 of sample #9 which is made of $Dy_{0.21}(Fe_{0.84}Co_{0.16})_{0.79}$ and is transition metal rich has the following properties:
Curie temperature $Tc_1=170°$ C.; and
coercive force $Hc_1$ at room temperature=15k Oe.

A magnetic layer 3 of sample #10 is made of $Dy_{0.23}(Fe_{0.84}Co_{0.16})_{0.77}$ which is a compensation composition and has the following properties:
Curie temperature $Tc_1=150°$ C.; and
coercive force $Hc_1$ at room temperature$\geq$20k Oe.

A magnetic layer 3 of sample #11 is made of $Dy_{0.23}(Fe_{0.80}Co_{0.20})_{0.77}$ which is a compensation composition and has the following properties:
Curie temperature $Tc_1=165°$ C.; and
coercive force $Hc_1$ at room temperature$\geq$20k Oe.

A magnetic layer 3 of sample #12 is made of $Dy_{0.19}(Fe_{0.84}Co_{0.16})_{0.81}$ which is transition metal rich and has the following properties:
Curie temperature $Tc_1=200°$ C.; and
coercive force $Hc_1$ at room temperature=8k Oe.

An overwriting operation by the light intensity modulation could be carried out on all of the above samples #9–#12 without remaining information under the recording conditions shown in Table 1.

The following magneto-optical disks of samples #13–#26 have the same configurations as those of the described sample #1 except the magnetic layer 5.

A magnetic layer 5 of sample #13 which is made of $(Gd_{0.50}Dy_{0.50})_{0.32}(Fe_{0.70}Co_{0.30})_{0.68}$ and rare-earth metal rich has the following properties:
Curie temperature $Tc_3=230°$ C.;
compensation temperature $T_{comp3}=220°$ C.; and
coercive force $Hc_3$ at room temperature=1.2k Oe.

A magnetic layer 5 of sample #14 which is made of $(Gd_{0.50}Dy_{0.50})_{0.30}(Fe_{0.70}Co_{0.30})_{0.70}$ and is rare-earth metal rich has the following properties:
Curie temperature $Tc_3=260°$ C.;
compensation temperature $T_{comp3}=210°$ C.; and
coercive force $Hc_3$ at room temperature=1.4k Oe.

A magnetic layer 5 of sample #15 which is made of $(Gd_{0.50}Dy_{0.50})_{0.30}(Fe_{0.80}Co_{0.20})_{0.70}$ and is rare-earth metal rich has the following properties:
Curie temperature $Tc_3=250°$ C.;
compensation temperature $T_{comp3}=210°$ C.; and
coercive force $Hc_3$ at room temperature=1.2k Oe.

A magnetic layer 5 of sample #16 which is made of $(Gd_{0.50}Dy_{0.50})_{0.30}(Fe_{0.60}Co_{0.40})_{0.70}$ and is rare-earth metal rich has the following properties:
Curie temperature $Tc_3=290°$ C.;
compensation temperature $T_{comp3}=210°$ C.; and
coercive force $Hc_3$ at room temperature=1.2k Oe.

A magnetic layer 5 of sample #17 which is made of $(Gd_{0.50}Dy_{0.50})_{0.30}(Fe_{0.55}Co_{0.45})_{0.70}$ and is rare-earth metal rich has the following properties:
Curie temperature $Tc_3=310°$ C.;
compensation temperature $T_{comp3}=210°$ C.; and
coercive force $Hc_3$ at room temperature=1.0k Oe.

A magnetic layer 5 of sample #18 which is made of $(Gd_{0.60}Dy_{0.40})_{0.30}(Fe_{0.80}Co_{0.20})_{0.70}$ and is rare-earth metal rich has the following properties:
Curie temperature $Tc_3=260°$ C.;
compensation temperature $T_{comp3}=210°$ C.; and
coercive force $Hc_3$ at room temperature=1.2k Oe.

A magnetic layer 5 of sample #19 which is made of $(Gd_{0.70}Dy_{0.30})_{0.30}(Fe_{0.80}Co_{0.20})_{0.70}$ and is rare-earth metal rich has the following properties:
Curie temperature $Tc_3=280°$ C.;
compensation temperature $T_{comp3}=210°$ C.; and
coercive force $Hc_3$ at room temperature=1.0k Oe.

A magnetic layer 5 of sample #20 which is made of $(Gd_{0.80}Dy_{0.20})_{0.30}(Fe_{0.80}Co_{0.20})_{0.70}$ and is rare-earth metal rich has the following properties:
Curie temperature $Tc_3=300°$ C.;
compensation temperature $T_{comp3}=210°$ C.; and
coercive force $Hc_3$ at room temperature=0.8k Oe.

A magnetic layer 5 of sample #21 which is made of $(Gd_{0.85}Dy_{0.15})_{0.30}(Fe_{0.80}Co_{0.20})_{0.70}$ and is rare-earth metal rich has the following properties:
Curie temperature $Tc_3=310°$ C.;
compensation temperature $T_{comp3}=220°$ C.; and
coercive force $Hc_3$ at room temperature=0.5k Oe.

A magnetic layer 5 of sample #22 which is made of $(Gd_{0.60}Dy_{0.40})_{0.31}(Fe_{0.70}Co_{0.30})_{0.69}$ and is rare-earth metal rich has the following properties:
Curie temperature $Tc_3=290°$ C.;
compensation temperature $T_{comp3}=230°$ C.; and
coercive force $Hc_3$ at room temperature=1.2k Oe.

A magnetic layer 5 of sample #23 which is made of $Dy_{0.28}(Fe_{0.70}Co_{0.30})_{0.72}$ and is rare-earth metal rich has the following properties:
Curie temperature $Tc_3=200°$ C.;
compensation temperature $T_{comp3}=180°$ C.; and
coercive force $Hc_3$ at room temperature=2.2k Oe.

A magnetic layer 5 of sample #24 which is made of $Dy_{0.28}(Fe_{0.60}Co_{0.40})_{0.72}$ and is rare-earth metal rich has the following properties:
Curie temperature $Tc_3=230°$ C.;
compensation temperature $T_{comp3}=185°$ C.; and
coercive force $Hc_3$ at room temperature=2.3k Oe.

A magnetic layer 5 of sample #25 which is made of $Dy_{0.29}(Fe_{0.50}Co_{0.50})_{0.71}$ and is rare-earth metal rich has the following properties:
Curie temperature $Tc_3=250°$ C.;
compensation temperature $T_{comp3}=190°$ C.; and
coercive force $Hc_3$ at room temperature=2.0k Oe.

A magnetic layer 5 of sample #26 which is made of $Dy_{0.30}(Fe_{0.50}Co_{0.50})_{0.70}$ and is rare-earth metal rich has the following properties:

Curie temperature $Tc_3=250°$ C.;

compensation temperature $T_{comp3}=190°$ C.; and coercive force $Hc_3$ at room temperature=1.8k Oe.

An overwriting operation by the light intensity modulation could be carried out on all of the above samples #13–#26 without remaining information under the recording conditions shown in Table 2.

TABLE 2

| Sample | Hinit (kOe) | Hw (Oe) | $P_H$ (mW) | $P_L$ (mW) | $P_R$ (mW) | recording bit length (μm) |
|---|---|---|---|---|---|---|
| #13 | 1.0 | 300 | 10 | 6 | 1 | 0.78 |
| #14 | 1.0 | 400 | 10 | 6 | 1 | 0.78 |
| #15 | 1.0 | 600 | 10 | 6 | 1 | 0.78 |
| #16 | 1.0 | 400 | 10 | 5 | 1 | 0.78 |
| #17 | 1.0 | 700 | 9 | 6 | 1 | 0.78 |
| #18 | 2.0 | 500 | 10 | 6 | 1 | 0.78 |
| #19 | 2.0 | 500 | 10 | 6 | 1 | 0.78 |
| #20 | 1.0 | 500 | 9 | 5 | 1 | 0.78 |
| #21 | 1.0 | 500 | 10 | 6 | 1 | 0.78 |
| #22 | 1.0 | 500 | 10 | 6 | 1 | 0.78 |
| #23 | 2.5 | 700 | 10 | 6 | 1 | 0.78 |
| #24 | 2.5 | 600 | 10 | 6 | 1 | 0.78 |
| #25 | 2.5 | 400 | 10 | 6 | 1 | 0.78 |
| #26 | 2.5 | 300 | 10 | 6 | 1 | 0.78 |
| #27 | 1.0 | 300 | 10 | 6 | 1 | 0.78 |
| #28 | 2.0 | 500 | 10 | 4 | 1 | 0.78 |
| #29 | 2.0 | 500 | 10 | 6 | 2 | 0.78 |

The magneto-optical disk of sample #27 has the same configurations as those of the described sample #1 except that a magnetic layer 4 is 30 nm thick.

An overwriting operation by the light intensity modulation could be carried out on the magneto-optical disk of sample #27 without remaining information under the conditions shown in Table 2. Since the film thickness of the magnetic layer 4 is thinner than that of sample #1, i.e., 50 nm thick, a recording operation could be carried out using a recording plus with a duty of 40% without trouble. Compared with sample #1 where the recording pulse with the duty factor of 60% was used, a recording sensitivity was improved.

Figure 5:
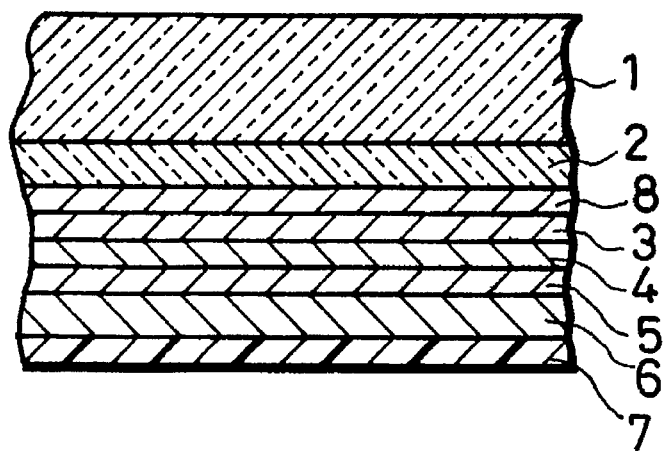
FIG. 5 is a cross-sectional view showing the schematic configuration of a magneto-optical disk in accordance with the second embodiment of the present invention.
Figure 6:
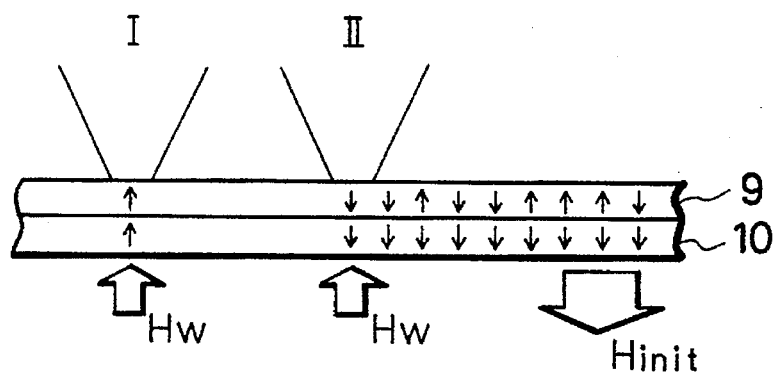
FIG. 6 which shows a prior art is an explanatory view showing processes for recording on a magneto-optical disk.
Figure 7:
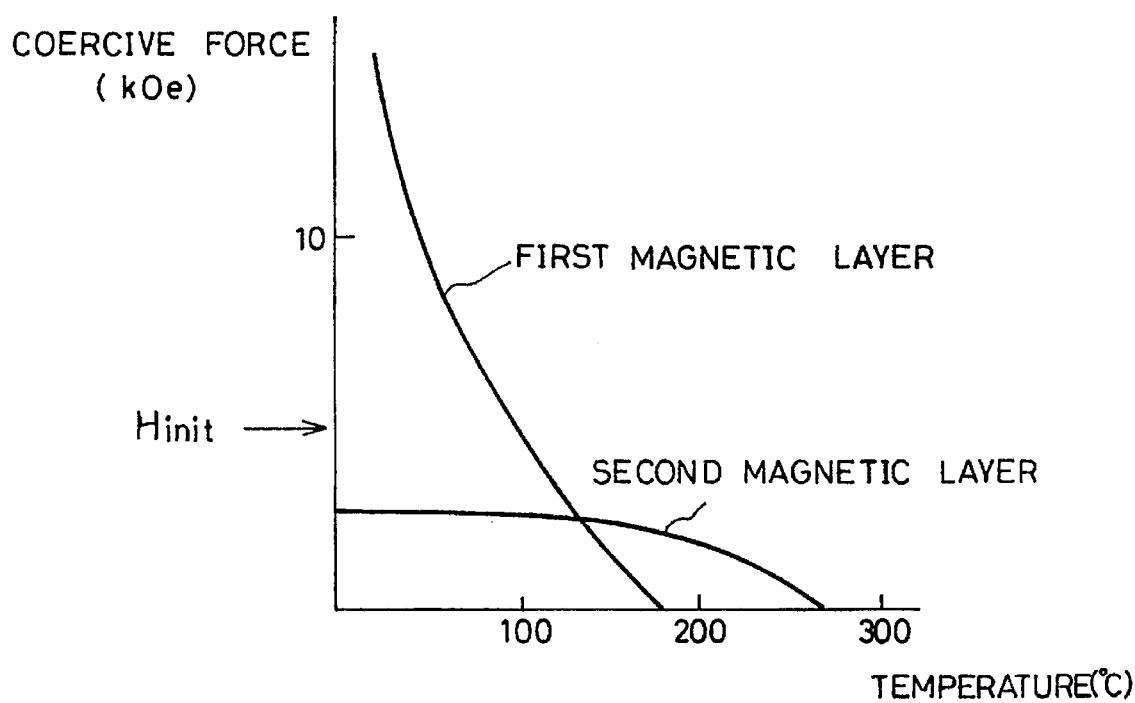
FIG. 7 is an explanatory view showing temperature dependencies of coercive force in each magnetic layer in the magneto-optical disk of FIG. 6.

The following description will discuss the second embodiment of the present invention in reference to FIG. 5. For convenience, members having the same functions as those shown in figures used in the previous embodiment will be designated by the same reference numerals, and thus the descriptions thereof shall be omitted here.

As shown in FIG. 5, a magneto-optical recording disk of the present embodiment differs from the previous embodiment in that a magnetic layer 8 (zeroth magnetic layer) is provided between a dielectric film 2 and a magnetic layer 3.

The magnetic layer 8 is arranged such that its Curie temperature $Tc_0$ is higher than that of the magnetic layer 3, and the coercive force $H_{c0}$ thereof at room temperature is nearly zero. The magnetic layer 8 has an in-plane magnetization at room temperature, and a transition occurs therein from the in-plane magnetization to the perpendicular magnetization at above a predetermined temperature.

For the above magneto-optical recording disk, samples of the magneto-optical disk is shown below.

Magneto-optical disks of samples #28 and #29 are respectively arranged such that the magnetic layer 8 with a thickness of 30 nm is provided between the dielectric layer 2 and the magnetic layer 3 of sample #1. The magneto-optical disks of samples #28 and #29 are manufactured in the same manner as sample #1.

A magnetic layer 8 of sample #28 which is made of $Gd_{0.25}(Fe_{0.80}Co_{0.20})_{0.75}$ and is rare-earth metal rich has the following properties:

Curie temperature $Tc_0=300°$ C.; and coercive force $Hc_0$ at room temperature≅0 Oe.

The magnetic layer 8 has no compensation temperature and is set such that a transition occurs therein from the in-plane magnetization to the perpendicular magnetization at around 100° C.

A magnetic layer 8 of sample #29 which is made of $Gd_{0.25}(Fe_{0.80}Co_{0.20})_{0.75}$ and is rare-earth metal rich has the following properties:

Curie temperature $Tc_0=300°$ C.; and coercive force $Hc_0$ at room temperature≅0 Oe.

The magnetic layer 8 has no compensation temperature and is set such that a transition occurs therein from the in-plane magnetization to the perpendicular magnetization at around 100° C.

An overwriting operation by the light intensity modulation could be carried out on both of the magneto-optical disks of samples #28 and #29 without remaining information under conditions shown in Table 2. The obtained C/N (signal to noise ratio) was 49 dB. Compared with sample #1 from which the C/N of 47 dB was obtained, a signal quality was significantly improved. This improvement could be achieved because by setting $Tc_0$ higher than $Tc_1$, a larger Kerr rotation angle could be made larger.

Moreover, when the magneto-optical disk of sample #1 was used, the C/N was suddenly dropped as the recording bit length became shorter. On the other hand, when samples #28 and #29 were used, the C/N was not dropped significantly as the recording bit length became shorter. This improvement was achieved from the following reason: since the magnetic layer 8 has the in-plane magnetization at room temperature, and a transition occurs from the in-plane magnetization to the perpendicular magnetization when a laser beam having a reproducing laser power of level III is projected, even in the case of a short recording bit, a reproducing operation can be carried out without being affected from the adjoining recording bit.

In the above preferred first and second embodiments, glass is used as a substrate 1 in samples #1–#29. However, other than glass, chemically tempered glass may be used. Alternatively, a 2 P layered glass substrate in which an ultraviolet ray hardening resin film is formed on the glass or chemically tempered glass substrate, polycarbonate (PC), polymethyl methacrylate (PMMA), amorphous polyolefin (APO), polystyrene (PS), polybiphenyl chloride (PVC), epoxy, etc., may be used for the substrate 1.

The thickness of AlN (transparent dielectric film 2) is not limited to 80 nm. The thickness of the transparent dielectric film 2 is determined in considering a so-called Kerr effect enhancement which increases a polar Kerr rotation angle from the readout layer 3 or the magnetic layer 8 utilizing the interference effect of light in reproducing from the magneto-optical disk. In order to make the signal quality (C/N) in reproducing as high as possible, the Kerr rotation angle should be set as large as possible.

A suitable film thickness changes depending on the wavelength of the reproducing light and the refractive index of the transparent dielectric film 2. In the present embodiment, AlN is used as a material for the transparent dielectric film 2, which has the refractive index of 2.0 with respective to the reproducing light with a wavelength of 780 nm. Thus, with the use of AlN with a thickness of 30–120 nm for the dielectric film 2, a large Kerr effect enhancement can be achieved. More preferably, AlN with a thickness of 70–100 nm is used for the transparent dielectric film 2 because the Kerr rotation angle is almost maximized in the above range of the film thickness.

However, the wavelength of the reproducing light is not limited to the above wavelength. For example, when a reproducing light with a wavelength of 400 nm which is substantially ½ of the above wavelength of 780 nm is used, the thickness of the transparent dielectric film 2 is preferably set ½ of the film thickness when the reproducing light with the wavelength of 780 nm is used.

Additionally, the refractive index of the transparent dielectric film 2 may be changed depending on a material used in the transparent dielectric film 2 or the method used in manufacturing the transparent dielectric film 2. In such a case, the thickness of the transparent dielectric film 2 is adjusted so as to set the refractive index×the film thickness= constant (optical path length).

As can be seen from the above explanation, by making the refractive index of the transparent dielectric film 2 greater, the film thickness of the transparent dielectric film 2 can be made thinner, and the greater enhance effect of the polar Kerr rotation angle can be achieved.

The refractive index of AlN can be changed by changing the ratio of Ar to $N_2$ (sputtering gas used in sputtering), the gas pressure, etc. In general, AlN has relatively large refractive index of approximately 1.8–2.1, and thus it is a suitable material for the transparent dielectric film 2.

Not only for the enhancement of the Kerr effect, the transparent dielectric film 2 also prevents the oxidization of the magnetic layers 3, 4 and 5, or the magnetic layers 8, 3, 4, and 5 respectively made of rare earth-transition metal alloys as the protective film 6 does.

The magnetic layer made of rare earth-transition metal alloys is likely to be oxidized, and especially, rare earth metal alloy is very likely to be oxidized. Therefore, entering of oxygen and moisture from outside must be prevented in order to prevent the deterioration of the properties of the layers.

Therefore, in samples #1–#29, the magnetic layers 3, 4 and 5 or the magnetic layers 8, 3, 4 and 5 are sandwiched by the AlN films. Since the AlN film is a nitrogen film which does not include oxygen, its moisture resistance is high.

Additionally, using Al target, a reactive DC (direct current) sputtering may be carried out by introducing $N_2$ gas or mixed gas of Ar and $N_2$. In this sputtering method, a faster film forming speed can be achieved compared with the RF (radio frequency) sputtering method.

Other than AlN, the following materials which have large refractive index are suitable for the transparent dielectric film 2: SiN, AlSiN, AlTaN, SiAlON, TiN, TiON, BN, ZnS, $TiO_2$, $BaTiO_3$ and $SrTiO_3$. Especially, since SiN, AlSiN, AlTaN, TiN, BN and ZnS do not include oxygen, the magneto-optical disk which has an excellent moisture resistance can be achieved.

The respective compositions of DyFeCo used in the magnetic layer 3, GdFeCo used in the magnetic layer 4 and GdDyFeCo used in the magnetic layer 5 are not limited to those shown in the above preferred embodiments. As materials for the magnetic layers 3, 4 and 5, an alloy in which a rare-earth metal of at least one element selecting from the group consisting of Gd, Tb, Dy, Ho and Nd and a transition metal of at least one element selecting from the group consisting of Fe and Co are combined may be used, and the same effect can be achieved.

Furthermore, by adding a small amount of at least one element selected from the group consisting of Cr, V, Nb, Mn, Be, Ni, Ti, Pt, Rh and Cu, the respective resistances to environment of the magnetic layers 3, 4 and 5 can be improved. Namely, the deterioration of the property of the magnetic layers 3, 4 and 5 due to the oxidation of the material by the moisture and oxygen being entered can be prevented, thereby ensuring a reliable performance of the magneto-optical disk for a long period of time.

The respective film thicknesses of the magnetic layers 3, 4 and 5 are determined by the materials used in the magnetic layers 3, 4 and 5, the compositions thereof and the thicknesses of other magnetic layers. Specifically, the film thickness of the magnetic layer 3 is preferably set to or above 20 nm, more preferably to or above 30 nm. On the other hand, when the magnetic layer 3 becomes too thick, information recorded on the magnetic layer 5 may not be copied thereto. Thus, it is preferably set to or below 100 nm. The film thickness of the magnetic layer 4 is preferably set to or above 5 nm, more preferably set in a range of 10 nm–50 nm. On the other hand, when the magnetic layer 4 becomes too thick, information recorded on the magnetic layer 5 may not be copied thereto. Thus, it is preferably set to or below 100 nm. The film thickness of the magnetic layer 5 is preferably set to or above 20 nm, more preferably set in a range of 10 nm–50 nm. On the other hand, when the magnetic layer 5 becomes too thick, the recording sensitivity thereof may be lowered. Thus, it is preferably set to or below 200 nm.

The Curie temperature $Tc_1$ of the magnetic layer 3 is preferably set in a range of 100° C.–250° C. This is because, when $Tc_1$ is set below 100° C., the C/N value becomes lower than 45 dB which is the lower limit of a range required for a digital recording and reproduction. On the other hand, when the Curie temperature $Tc_1$ is above 250° C., the recording sensitivity is lowered. Additionally, when the coercive force $Hc_1$ of the magnetic layer 3 at room temperature is set to or below 5k Oe, a part of the magnetic layer 3 may be initialized by the initializing magnetic field $H_{init}$. Thus, the coercive force $Hc_1$ of the magnetic layer 3 at room temperature is preferably set to or above 5k Oe.

When a temperature at which a transition occurs in the magnetic layer 4 to a perpendicular magnetization is set below 80° C., the magnetization may be copied from the magnetic layer 5 to the magnetic layer 4 or from the magnetic layer 4 to the magnetic layer 3 between room temperature and a temperature at which a laser beam $P_R$ is projected. Thus, not only the magnetic layer 5 but also the magnetic layer 3 may be initialized by the initializing magnetic field $H_{init}$, and if this occurs, a recording operation cannot be carried out. For this reason, the temperature at which a transition occurs in the magnetic layer 4 from the in-plane magnetization to the perpendicular magnetization is preferably set to or above 80° C.

The Curie temperature $Tc_2$ of the magnetic layer 4 is preferably set higher than the Curie temperature $Tc_1$ of the magnetic layer 3. This is because, when the the Curie temperature $Tc_2$ is lower than the Curie temperature $Tc_1$, the magnetization cannot be copied desirably in the process of overwriting by the light intensity modulation.

The Curie temperature $Tc_3$ of the magnetic layer 5 is preferably set in a range of 150° C.–400° C. This is because, when the Curie temperature $Tc_3$ is set below 150° C., a difference between $P_L$ and $P_R$ becomes small, and thus an overwriting by the light intensity modulation may not be carried out desirably. On the other hand, when the Curie temperature $Tc_3$ is set to or above 400° C., a recording sensitivity is lowered. The coercive force $Hc_3$ of the magnetic layer 5 at room temperature is preferably set to or below 3k Oe. This is because when the coercive force $Hc_3$ of the magnetic layer 5 at room temperature exceeds 3k Oe, an initializing magnetic field $H_{init}$ generating device becomes large, and thus it is not preferable.

The compensation temperature $T_{comp2}$ of the magnetic layer 4 is preferably set lower than the compensation temperature $T_{comp3}$ of the magnetic layer 5. This is because, when the Curie temperature $Tc_2$ of the magnetic layer 4 is lower than the compensation temperature $T_{comp3}$ of the magnetic layer 5, a margin of an intensity of a laser beam of High level I and a margin of an intensity of a laser beam of Low level II become large.

The film thickness of AlN (protective film 6) is set to 80 nm in the present embodiment. However, it is not limited to this, and is preferably set in a range of 1 nm–200 nm.

The total thickness of the magnetic layers 3, 4 and 5 or the magnetic layers 3, 4, 5 and 8 is set above 100 nm in the present embodiment. With this thickness, a light which is incident thereon from the optical pickup is hardly transmitted through the magnetic layers. Therefore, there is no limit for the film thickness of the protective film 6 as long as the oxidization of the magnetic films can be prevented for a long period of time. Therefore, when the material which has low oxidization resistance is used, the film thickness should be made thick; on the other hand, when the material which has a high oxidization resistance is used, the film thickness should be made thin.

The thermal conductivity of the protective film 6 as well as the transparent dielectric film 2 affects the recording sensitivity of the magneto-optical disk. Specifically, the recording sensitivity represents the laser power required for recording or erasing. The light incident on the magneto-optical disk is mainly transmitted through the transparent dielectric film 2. Then, it is absorbed by the magnetic layers 3, 4 and 5, or 3, 4, 5 and 8 which are absorbing films, and changes into heat. Here, heat generated from the magnetic layers 3, 4 and 5 or 3, 4 5 and 8 moves onto the transparent dielectric film 2 and the protective film 6 by the conduction of heat. Therefore, the respective thermal conductivities and the thermal capacities (specific heat) of the transparent dielectric film 2 and the protective film 6 affect the recording sensitivity.

This means that the recording sensitivity of the magneto-optical disk can be controlled to some extent by adjusting the film thickness of the protective film 6. For example, by making the film thickness of the protective film 6 thinner, the recording sensitivity can be increased (a recording or erasing operation can be carried out with low laser power). Normally, in order to extend the life of the laser, it is preferable to have relatively high recording sensitivity, and thus the thinner protective film 6 is preferable.

In this sense also, AlN is a suitable material. Because of its excellent moisture resistance, by adapting it to the protective film 6, the film thickness can be made thinner and the magneto-optical disk which ensures a high recording sensitivity can be achieved.

In the present embodiment, AlN is used both in the protective film 6 and the transparent dielectric film 2. Therefore, the magneto-optical disk of the present invention has an excellent moisture resistance. Moreover, since the same material is used for the transparent dielectric film 2 and the protective film 6, the productivity of the magneto-optical disk can be improved.

In considering the above objective and effect, other than AlN, the following materials which can be used also as materials for the transparent dielectric film 2 are suitable for the protective film 6: SiN, AlSiN, AlTaN, SiAlON, TiN, TiON, BN, ZnS, $TiO_2$, $BaTiO_3$ and $SrTiO_3$.

Especially, when SiN, AlSiN, AlTaN, TiN, BN or ZnS which does not include oxygen is used, a magneto-optical disk which has an excellent moisture resistance can be achieved.

The magneto-optical disks of samples #1–#29 are so called single sided type. A thin film composed of the transparent dielectric film 2, the magnetic films 3–5 (or magnetic films 3–5 and 8) and the protective film 6 is hereinafter referred to as a recording medium layer. The magneto-optical disk of the single sided type is composed of the substrate 1, the recording medium layer and the overcoat film 7.

On the other hand, the magneto-optical disk of a both-sided type is arranged such that a pair of the substrates 1 whereon the recording medium layers are respectively laminated by an adhesive layer are provided so that respective recording medium layers confront one another.

As to the material for the adhesive layer, especially, polyurethane acrylate adhesive is preferable. The above adhesive layer is provided with a combination of the hardening properties obtained by ultraviolet ray, heat and anaerobic. Therefore, this adhesive layer has an advantage that the shadow portion of the recording medium layer through which the ultraviolet ray is not transmitted can be hardened by heat and anaerobic. Moreover, because of its high moisture resistance, a reliable performance of the magneto-optical disk of double-sided type can be ensured for a long period of time.

On the other hand, the magneto-optical disk of a single-sided type is suitable for a compact magneto-optical recording and reproducing device because the required thickness is as thin as ½ of that required for the both-sided magneto-optical disk.

The magneto-optical disk of a double-sided type is suitable for the large capacity magneto-optical recording and reproducing device because both sides can be used for recording and reproducing.

In the above preferred embodiments, explanations have been given through the case of the magneto-optical disk as a magneto-optical recording medium. However, magneto-optical card, magneto-optical tape, etc. may be equally used.

As described, the magneto-optical recording medium of the present embodiment is arranged such that the magnetic layer 3, the magnetic layer 4 and the magnetic layer 5 which are respectively made of rare earth-transition metal alloys are laminated in this order. The magnetic layer 3 has a perpendicular magnetization in a temperature range between room temperature and its Curie temperature. The magnetic layer 4 has properties that its Curie temperature is higher than that of the magnetic layer 3, the coercive force thereof at room temperature is nearly zero, and that it has an in-plane magnetization at room temperature and a transition occurs therein from the in-plane magnetization to the perpendicular magnetization at above a predetermined temperature. The magnetic layer 5 has properties that it has a perpendicular magnetization in a temperature range between room temperature and its Curie temperature, the Curie temperature thereof is set higher than that of the magnetic layer 3, the coercive force thereof at room temperature is set lower than that of the magnetic layer 3, and that its compensation temperature is set higher than that of the magnetic layer 4.

According to the above arrangement, a magnetic coupling between the magnetic layer 3 and the magnetic layer 5 will not occur at room temperature. On the other hand, at high temperature at which a recording operation can be carried out, the magnetic coupling between the magnetic layers 3 and 5 occurs. Thus, an overwriting operation by the light intensity modulation can be carried out. Moreover, a recording operation on the magnetic layer 3 can be smoothly carried out.

In the above arrangement, the magnetic layer 5 is arranged such that its Curie temperature falls within a range of 150°–400° C. and that the coercive force thereof at room temperature is 3k Oe or below. Thus, the required initializing magnetic field can be set to 3k Oe or below.

Additionally, the composition of the magnetic layer 3 is set either transition metal rich or compensating composition at room temperature. The composition of the magnetic layer 4 is set rare earth metal rich at room temperature, and the compensation temperature is set in a range of 100°–250° C. The composition of the magnetic layer 5 is rare-earth metal rich at room temperature, and the compensation temperature is set in a range of 100°–300° C.

The direction of the magnetization in the magnetic layer 5 is dominated by the rare earth metal in a temperature range between room temperature and Curie temperature, while it is dominated by transition metal in a temperature range between compensation temperature and Curie temperature. Namely, the magnetization recorded at high temperature at which a recording operation is permitted is reversed as the temperature drops to room temperature. Therefore, the recording magnetic field can be arranged in the direction of the initializing magnetic field.

The magneto-optical recording medium of the present invention may be arranged so as to further include a zeroth magnetic layer formed on a surface of the magnetic layer 3 on the side where the magnetic layer 4 is not formed. The zeroth magnetic layer is set such that its Curie temperature is higher than the magnetic layer 3, the coercive force thereof at room temperature is nearly zero, it has an in-plane magnetization at room temperature and that a transition occurs therein from the in-plane magnetization to a perpendicular magnetization at above a predetermined temperature.

According to the above arrangement, an overwriting operation by the light intensity modulation is permitted. Moreover, in reproducing, when a light beam is projected onto the magnetic layer 8, the temperature distribution of the portion becomes like a Gaussian distribution, and thus only the temperature of the central portion which is smaller than the light beam diameter is raised.

As the temperature rises, a transition occurs in the light projected portion from the in-plane magnetization to a perpendicular magnetization. Here, by the exchange coupling force exerted between the magnetic layer 8 and the magnetic layer 3, the magnetization direction in the magnetic layer 8 is arranged in the magnetization direction in the magnetic layer 3. When a transition occurs from the in-plane magnetization to the perpendicular magnetization in the portion having a temperature rise, a polar Kerr effect is shown only in the portion, thereby reproducing information based on the light reflected therefrom.

When a light beam is shifted so as to reproduce the next recording bit, the temperature of the previously reproduced potion is cooled off, and thus a transition occurs from the perpendicular magnetization to the in-plane magnetization in the portion and the polar Kerr effect is no longer shown in the portion. This means that the magnetization recorded on the magnetic layer 3 is not readout by being masked by the in-plane magnetization in the magnetic layer 8. Therefore, information is no longer reproduced from the spot having a temperature drop and thus interferences by signals from adjoining bits, which generate a noise and reduce a resolution in reproducing, can be eliminated.

As described, in the above arrangement, only the portion having a temperature rise above a predetermined temperature can be made subject to reproduction. Therefore, the reproduction of a smaller recording bit is enabled compared with the conventional model, thereby permitting a significant improvement in the recording density.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magneto-optical recording medium, comprising:

a first magnetic layer made of an alloy of a rare-earth metal and a transition metal;

a second magnetic layer, made of an alloy of a rare-earth metal and a transition metal, formed on said first magnetic layer; and a third magnetic layer, made of an alloy of a rare-earth metal and a transition metal, formed on said second magnetic layer, wherein:

said first magnetic layer is made of DyFeCo and has a perpendicular magnetization in a temperature range between room temperature and its Curie temperature, said Curie temperature being in a range between 100° C. and 250° C., and a coercive force at room temperature of said first magnetic layer is at or above 5k Oe;

said second magnetic layer is made of GdFeCo and has properties such that its Curie temperature is higher than the Curie temperature of said first magnetic layer, a coercive force thereof at room temperature is negligible and that it has an in-plane magnetization at room temperature and a transition occurs therein from the in-plane magnetization to a perpendicular magnetization at above 80° C.; and said third magnetic layer is made of a material selected from the group consisting of GdDyFeCo and DyFeCo, and has properties such that it has a perpendicular magnetization in a temperature range between room temperature and its Curie temperature, its Curie temperature falls within a range between 150° C. and 400° C., and that the coercive force thereof at room temperature is at or below 3k Oe, thereby permitting an initializing magnetic field and a recording magnetic field to have a common direction, and thereby facilitating magnetic coupling between said third magnetic layer and said first magnetic layer only at an elevated temperature, such coupling being blocked at room temperature by said second magnetic layer.

2. The magneto-optical recording medium as set forth in claim 1, wherein:

said first magnetic layer has a "compensation" composition, that is, a composition whose compensation temperature is at room temperature, or a transition-metal-rich composition where a proportion of the transition metal is greater than that in the compensation composition at room temperature;

a composition of said second magnetic layer is rare-earth-metal-rich where the proportion of the rare-earth metal is greater than that in the compensation composition at room temperature and its compensation temperature is in a range between 100° C. and 250° C.; and a composition of said third magnetic layer is rare-earth-metal-rich at room temperature and its compensation temperature is in a range between 100° C. and 300° C.

3. The magneto-optical recording medium as set forth in claim 1 wherein:

said first magnetic layer is made of $Dy_a(Fe_bCo_{1-b})_{1-a}$;

said second magnetic layer is made of $Gd_c(Fe_dCo_{1-d})_{1-c}$; and said third magnetic layer is made of a material selected from the group consisting of $(Gd_eDy_{1-e})_g(Fe_fCo_{1-f})_{1-g}$ and $Dy_h(Fe_iCo_{1-i})_{1-h}$, said a, b, c, d, e, f, g, h and i respectively satisfying the following inequalities:

$0.18 \leq a \leq 0.25$, $0.70 \leq b \leq 0.90$, $0.20 \leq c \leq 0.35$, $0.50 \leq d \leq 0.90$, $0.10 \leq e \leq 0.95$, $0.30 \leq f \leq 0.90$, $0.28 \leq g \leq 0.33$, $0.28 \leq h \leq 0.33$ and $0.30 \leq i \leq 0.80$.

4. The magneto-optical recording medium as set forth in claim 2, wherein:

said first magnetic layer has a film thickness in a range between 20 nm and 100 nm, said second magnetic layer has a film thickness in a range between 5 nm and 50 nm, and said third magnetic layer has a film thickness in a range between 20 nm and 200 nm.

5. The magneto-optical recording medium as set forth in claim 3, wherein:

said first magnetic layer is made of $Dy_{0.19}(Fe_{0.86}Co_{0.14})_{0.81}$, said second magnetic layer is made of $Gd_{0.27}(Fe_{0.60}Co_{0.40})_{0.73}$ having its compensation temperature at 150° C., and said third magnetic layer is made of $(Gd_{0.50}Dy_{0.50})_{0.30}(Fe_{0.72}Co_{0.28})_{0.70}$ having its compensation temperature at 210° C.

6. The magneto-optical recording medium as set forth in claim 1, further comprising a zeroth magnetic layer formed on said first magnetic layer on a side where said second magnetic layer is not formed, wherein:

said zeroth magnetic layer has a Curie temperature which is higher than the Curie temperature of said first magnetic layer, the coercive force thereof at room temperature is negligible, and has an in-plane magnetization at room temperature and a transition occurs therein from the in-plane magnetization to a perpendicular magnetization at above a predetermined temperature which is above room temperature.

7. A magneto-optical recording and reproducing device for recording on, or reproducing from, a magneto-optical recording medium which comprises a first magnetic layer made of an alloy of a rare-earth metal and a transition metal;

a second magnetic layer, made of an alloy of a rare-earth metal and a transition metal, formed on said first magnetic layer; and a third magnetic layer, made of an alloy of a rare-earth metal and a transition metal, formed on said second magnetic layer, wherein:

said first magnetic layer is made of DyFeCo and has a perpendicular magnetization in a temperature range between room temperature and its Curie temperature, said Curie temperature being in a range between 100° C. and 250° C., and a coercive force at room temperature of said first magnetic layer is at or above 5k Oe;

said second magnetic layer is made of GdFeCo and has properties such that its Curie temperature is higher than the Curie temperature of said first magnetic layer, a coercive force thereof at room temperature is negligible and that it has an in-plane magnetization at room temperature and a transition occurs therein from the in-plane magnetization to a perpendicular magnetization at above 80° C.; and said third magnetic layer is made of a material selected from the group consisting of GdDyFeCo and DyFeCo, and has properties such that it has a perpendicular magnetization in a temperature range between room temperature and its Curie temperature, its Curie temperature falls within a range between 150° C. and 400° C., and that the coercive force thereof at room temperature is at or below 3k Oe, thereby permitting an initializing magnetic field and a recording magnetic field to have a common direction, and thereby facilitating magnetic coupling between said third magnetic layer and said first magnetic layer only at an elevated temperature, such coupling being blocked at room temperature by said second magnetic layer, said magneto-optical recording and reproducing device comprising:

means for generating an initializing magnetic field for use in initializing said third magnetic layer when overwriting;

light projection means for projecting a light beam onto said magneto-optical recording medium according to information; and means for generating a recording magnetic field to be applied to said third magnetic layer, wherein the initializing magnetic field, generated from said means for generating the initializing magnetic field, and the recording magnetic field, generated from said means for generating the recording magnetic field, have the same direction.

* * * * *